US012620609B2

(12) United States Patent　(10) Patent No.:　US 12,620,609 B2

Shimizu et al.　(45) Date of Patent:　May 5, 2026

(54) METHOD FOR CONTROLLING FUEL CELL SYSTEM, FUEL CELL SYSTEM, AND FUEL CELL VEHICLE

(71) Applicant: HONDA MOTOR CO., LTD., Tokyo (JP)

(72) Inventors: Kenichi Shimizu, Tokyo (JP); Kenta Suzuki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 496 days.

(21) Appl. No.: 17/990,941

(22) Filed: Nov. 21, 2022

(65) Prior Publication Data

US 2023/0170507 A1　Jun. 1, 2023

(30) Foreign Application Priority Data

Nov. 29, 2021　(JP) ................................. 2021-192618

(51) Int. Cl.
　*H01M 8/04858*　(2016.01)
　*B60L 58/30*　(2019.01)
　*H01M 8/04992*　(2016.01)

(52) U.S. Cl.
　CPC ......... *H01M 8/04932* (2013.01); *B60L 58/30* (2019.02); *H01M 8/04873* (2013.01); *H01M 8/04992* (2013.01); *H01M 2250/20* (2013.01)

(58) Field of Classification Search
　CPC . H01M 8/04–04953; H02M 7/00–003; H02M 7/42–44; B60L 3/00; B60L 3/12; B60L 15/00; B60L 15/02–04; B60L 15/20–2045
　See application file for complete search history.

(56) References Cited

U.S. PATENT DOCUMENTS

| | | | |
|---|---|---|---|
| 2005/0048335 A1* | 3/2005 | Fields, III ........... | H01M 8/0488 |
| | | | 429/432 |
| 2010/0025133 A1 | 2/2010 | Hamada et al. | |
| 2012/0083940 A1 | 4/2012 | Mori et al. | |
| 2016/0114690 A1* | 4/2016 | Matsubara .............. | B60L 58/40 |
| | | | 307/10.1 |

(Continued)

FOREIGN PATENT DOCUMENTS

| | | |
|---|---|---|
| CN | 102458905 A | 5/2012 |
| JP | 2008-199802 A | 8/2008 |

(Continued)

OTHER PUBLICATIONS

Office Action dated May 28, 2024 issued in the corresponding Japanese Patent Application No. 2021-192618 A with the English machine translation thereof.

(Continued)

*Primary Examiner* — Nicole M. Buie-Hatcher
*Assistant Examiner* — Jacob Buchanan
(74) *Attorney, Agent, or Firm* — Carrier, Shende & Associates P.C.; Joseph P. Carrier; Jeffrey T. Gedeon

(57) ABSTRACT

By processing circuitry executing a program recorded in a storage unit, a control method for a fuel cell system includes calculating a load output and calculating a maximum output, comparing the load output with the maximum output, and controlling, in a case that the load output exceeds the maximum output, the fuel cell system to decrease a power storage output used by a load, by increasing a power generation output.

3 Claims, 7 Drawing Sheets

(56)                References Cited

U.S. PATENT DOCUMENTS

2017/0066337 A1      3/2017  Kazuno et al.
2020/0101965 A1 *   4/2020  Yang ........................ B60L 58/20
2023/0038076 A1 *   2/2023  Lu ............................ B62J 43/16

FOREIGN PATENT DOCUMENTS

JP          2016019353  A  *  2/2016   ............ Y02T 10/72
JP          2016-086551 A      5/2016
JP          2017-051042 A      3/2017
JP          2018-153021 A      9/2018
WO      WO-2021136061 A1 *  7/2021   .......... H01M 16/006

OTHER PUBLICATIONS

Office Action dated Oct. 8, 2024 issued in the corresponding Japanese Patent Application No. 2021-192618 with the English machine translation thereof.
Office Action dated Nov. 28, 2025 issued in the corresponding Chinese Patent Application No. 202211474998.X with the English machine translation thereof.

* cited by examiner

METHOD FOR CONTROLLING FUEL CELL SYSTEM, FUEL CELL SYSTEM, AND FUEL CELL VEHICLE

CROSS-REFERENCE TO RELATED APPLICATIONS

This application is based upon and claims the benefit of priority from Japanese Patent Application No. 2021-192618 filed on Nov. 29, 2021, the contents of which are incorporated herein by reference.

BACKGROUND OF THE INVENTION

Field of the Invention

The present invention relates to a method of controlling a fuel cell system including a motor driven by an output of a fuel cell and an output of an electrical power storage device, a fuel cell system, and a fuel cell vehicle.

Description of the Related Art

JP 2017-051042 A discloses a fuel cell system in which a motor is driven by an output of a fuel cell (electric power generation output) and an output of an electrical power storage device (electrical power storage output), and a fuel cell vehicle equipped with the fuel cell system. This fuel cell system can make maximum use of the combined output of the electric power generation output and the electrical power storage output. This fuel cell system includes a converter for the fuel cell and a converter for the electrical power storage device. The converter for the fuel cell converts a low-voltage electric power generation output into a high-voltage electric power generation output. The converter for the electrical power storage device converts a low-voltage electrical power storage output into a high-voltage electrical power storage output. A controller of the fuel cell system adjusts the elevating or boosting ratio of both converters so that the output voltage (power generation voltage) of the fuel cell does not exceed the output voltage (power storage voltage) of the electrical power storage device.

SUMMARY OF THE INVENTION

In the fuel cell system, cost reduction is an important problem. For example, by eliminating a converter for the electrical power storage device, the cost of the fuel cell system is reduced.

In the fuel cell system of JP 2017-051042 A, if the converter for the electrical power storage device is eliminated, an output terminal of the converter for the fuel cell and the electrical power storage device are directly connected. According to this structure, the output of the electrical power storage device is directly supplied to a motor. Therefore, when the voltage of the electrical power storage device decreases, the electric power that can be supplied to the motor also decreases. For example, it is assumed that a driver steps on an accelerator pedal in a state where the electric power that can be supplied to the motor is reduced. In this case, the electrical power storage device cannot supply sufficient electric power to the motor. Therefore, the fuel cell system cannot accelerate the vehicle as requested by the driver.

An object of the present invention is to solve the aforementioned problem.

A first aspect of the present invention is a control method for a fuel cell system. The fuel cell system includes a fuel cell configured to generate power generation voltage, an electrical power storage device configured to generate power storage voltage, a load including a motor and an inverter including AC terminals connected to the motor and DC terminals connected to the electrical power storage device, a boost converter including input terminals connected to the fuel cell and output terminals connected to each of the electrical power storage device and the DC terminals of the inverter, a memory, and processing circuitry configured to execute a program recorded in the memory. By the processing circuitry executing the program recorded in the memory, the method includes calculating a load output that is electric power required to drive the load, and calculating a maximum output that is maximum electric power that is configured to be supplied from the electrical power storage device to the load, comparing the load output with the maximum output; and controlling, in a case that the load output exceeds the maximum output, the fuel cell system to decrease a power storage output used by the load, by increasing a power generation output, which is electric power supplied from the fuel cell to the load via the boost converter.

A second aspect of the present invention is a fuel cell system including a fuel cell configured to generate power generation voltage, an electrical power storage device configured to generate power storage voltage, a load including a motor and an inverter including AC terminals connected to the motor and DC terminals connected to the electrical power storage device, a boost converter including input terminals connected to the fuel cell and output terminals connected to each of the electrical power storage device and the DC terminals of the inverter, a memory, and processing circuitry configured to execute a program recorded in the memory. By the processing circuitry executing the program recorded in the memory, the system calculates a load output that is electric power required to drive the load, and calculating a maximum output that is maximum electric power that is configured to be supplied from the electrical power storage device to the load, compares the load output with the maximum output, and controls, in a case that the load output exceeds the maximum output, the fuel cell system to decrease a power storage output used by the load, by increasing a power generation output, which is electric power supplied from the fuel cell to the load via the boost converter.

A third aspect of the present invention is a fuel cell vehicle in which the fuel cell system according to the second aspect is mounted, wherein the motor is used as a traveling motor.

According to the present invention, even if a fuel cell system does not include a converter for an electrical power storage device, performance of a motor can be sufficiently exhibited.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

[1 Configuration of Fuel Cell System 12, and Configuration of Fuel Cell Vehicle 10]

Figure 1:
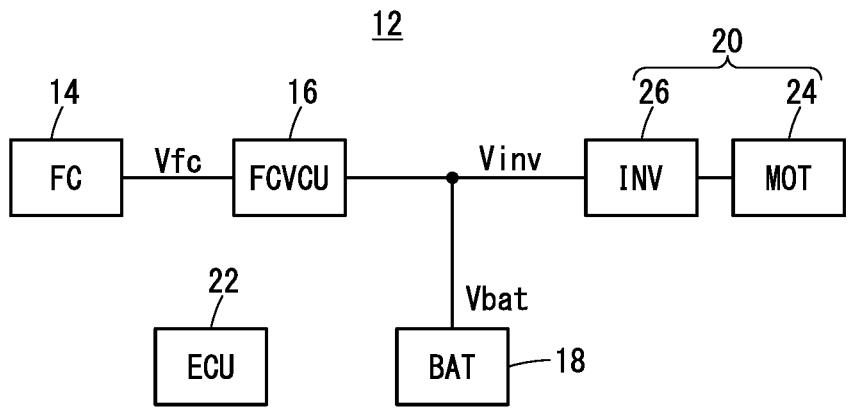
FIG. 1 is a block diagram of a fuel cell system.
Figure 2:
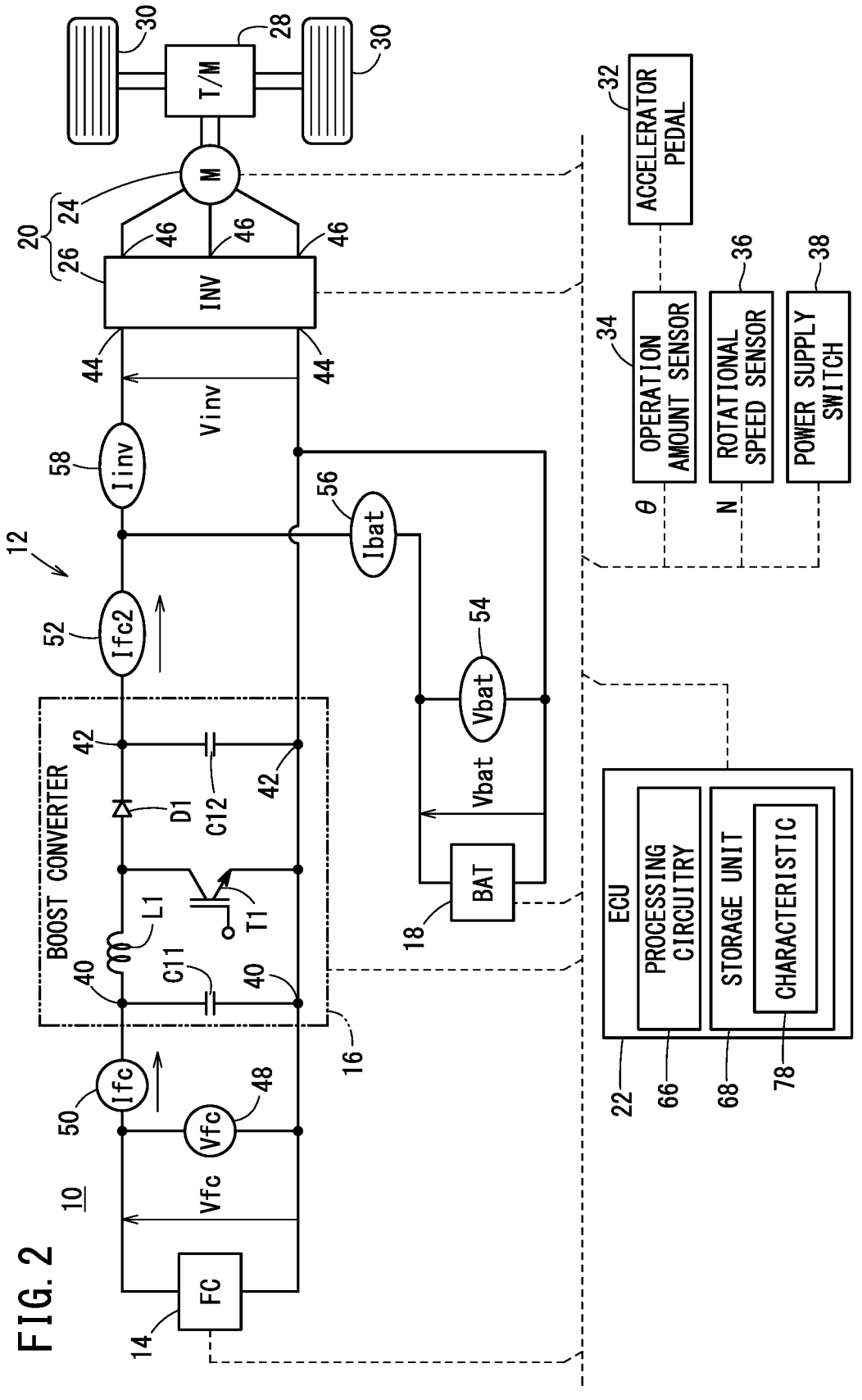
FIG. 2 is a schematic view of the configuration of a fuel cell vehicle equipped with the fuel cell system.

FIG. 1 is a simplified block diagram of a fuel cell system 12. FIG. 2 is a schematic diagram of the configuration of a fuel cell vehicle 10 equipped with the fuel cell system 12. In the present specification, the fuel cell vehicle 10 is also simply referred to as a vehicle 10.

As shown in FIG. 1, the fuel cell system 12 includes a fuel cell 14, a boost (step-up) converter 16, an electrical power storage device 18, a load 20, and an electronic control unit 22. The fuel cell system 12 according to the present embodiment is mounted in a vehicle 10. In the vehicle 10, the load 20 of the fuel cell system 12 is a motor 24 for traveling and an inverter 26 connected to the motor 24. The fuel cell system 12 and the control method of the fuel cell system 12 described below can be used not only in the vehicle 10 but also in a plant or the like of facilities (factories and the like).

Some components of the fuel cell system 12 have the following abbreviations. For example, the fuel cell 14 is also referred to as an "FC". The boost converter 16 is also referred to as an "FCVCU". The electrical power storage device 18 is also referred to as a "BAT". The motor 24 is also referred to as an "MOT". The inverter 26 is also referred to as an "INV". The electronic control unit 22 is also referred to as an "ECU".

As shown in FIG. 2, the vehicle 10 includes a transmission 28, wheels 30, an accelerator pedal 32, an operation amount sensor 34, a rotational speed sensor 36, and a power supply switch (power supply SW) 38 in addition to the fuel cell system 12. The transmission 28 is also referred to as a "T/M". In FIG. 2, wires (signal lines and the like) between the ECU 22 and the respective components are partially omitted to avoid complexity.

Each of the fuel cell 14 and the electrical power storage device 18 functions as a parallel power supply device (so-called hybrid power supply) of the vehicle 10. The power supply device supplies electrical power (output) to the load 20. In the fuel cell system 12, the power of the fuel cell 14 is at a relatively low voltage. The output of the fuel cell 14 is referred to as a power generation output Pfc. The power generation output Pfc of the fuel cell 14 is changed to a relatively high-voltage power generation output Pfc via the boost converter 16, and is supplied to the load 20. On the other hand, in the fuel cell system 12, the electrical power of the electrical power storage device 18 has a relatively high voltage. The output of the electrical power storage device 18 is referred to as a power storage output Pbat. The power storage output Pbat is supplied directly to the load 20. The power storage output Pbat is also supplied to an auxiliary load (not shown) of the vehicle 10 in addition to the load 20.

The auxiliary load includes, for example, an air pump that drives the fuel cell 14, a lighting device of the vehicle 10, an electric power steering device, or the like.

The fuel cell 14 has, for example, a structure in which unit cells are stacked. Each of the unit cells includes a solid polymer electrolyte membrane, an anode, and a cathode. The solid polymer electrolyte membrane is sandwiched between the anode and the cathode.

An anode system, a cathode system, a cooling system, and the like are provided near the fuel cell 14. The anode system includes a fuel gas supply source including a fuel tank. The anode system supplies a fuel gas (hydrogen) to the anode of the fuel cell 14. The cathode system includes an oxygen-containing gas supply source including an air pump. The cathode system supplies air containing oxygen (oxygen-containing gas) to the cathode of the fuel cell 14. The cooling system includes a cooling pump. The cooling system cools the fuel cell 14 with a coolant.

The electrical power storage device 18 is an energy storage including a plurality of battery cells. As the electrical power storage device 18, for example, a lithium-ion secondary battery, a nickel-hydrogen secondary battery, or the like can be used. In the present embodiment, a lithium-ion secondary battery is used as the electrical power storage device 18. A capacitor can also be used as the electrical power storage device 18.

The boost converter 16 is a chopper-type step-up converter. As shown in FIG. 2, the boost converter 16 includes, for example, a choke coil (inductor) L1, a diode D1, a switching device (transistor) T1, and smoothing capacitors C11 and C12. Each input terminal 40 of the boost converter 16 is connected to the fuel cell 14. Each output terminal 42 of the boost converter 16 is connected to the inverter 26 and the electrical power storage device 18.

The boost converter 16 performs duty control to turn on/off the switching element T1 in accordance with a duty ratio D. By this duty control, the boost converter 16 elevates the power generation voltage Vfc, which is the output voltage of the fuel cell 14, and applies the elevated voltage to the inverter 26 as an inverter DC terminal voltage Vinv. In the fuel cell system 12 of the present embodiment, each output terminal 42 of the boost converter 16 is directly connected to each terminal of the electrical power storage device 18. Therefore, the inverter DC terminal voltage Vinv is equal to the power storage voltage Vbat. The boosting ratio (Vbat/Vfc) is calculated as (Vbat/Vfc)={1/(1−D)}, as is well known.

The inverter 26 is, for example, a three-phase, full-bridge DC/AC converter that operates bidirectionally. Each DC terminal 44 of the inverter 26 is connected to the boost converter 16 and the electrical power storage device 18. Each AC terminal 46 of the inverter 26 is connected to the motor 24. During power running of the vehicle 10 (motor 24), the inverter 26 converts DC power (power generation output Pfc, power storage output Pbat) supplied from at least one of the fuel cell 14 or the electrical power storage device 18 into three-phase AC power and supplies the three-phase AC power to the motor 24. On the other hand, during regeneration in which the motor 24 rotates without being driven through the inverter 26, the inverter 26 converts three-phase AC power generated by power generation of the motor 24 into DC power and supplies the DC power to the electrical power storage device 18.

A first voltage sensor 48 and a first current sensor 50 are connected to a circuit between the fuel cell 14 and the boost converter 16. The first voltage sensor 48 detects a power generation voltage Vfc of the fuel cell 14. The first current sensor 50 detects a power generation current Ifc of the fuel cell 14. A second current sensor 52 is connected to the positive output terminal 42 of the boost converter 16. The second current sensor 52 detects the power generation current Ifc2 output from the boost converter 16. A second voltage sensor 54 and a third current sensor 56 are connected to a circuit between the boost converter 16 and the electrical power storage device 18. The second voltage sensor 54 detects a power storage voltage Vbat of the electrical power storage device 18. The third current sensor 56 detects a power storage current Ibat of the electrical power storage device 18. A fourth current sensor 58 is connected to the positive DC terminal 44 of the inverter 26. The fourth current sensor 58 detects an inverter DC terminal current Iinv. Signals indicating detection values of the respective sensors are supplied to the ECU22 through signal lines (some of which are not shown). The signal lines may be wired, or such signals may be supplied wirelessly.

In the fuel cell system 12, the electrical power storage device 18 is directly connected to the DC terminal 44 of the inverter 26. Therefore, the inverter DC terminal voltage Vinv of the inverter 26 is equal to the power storage voltage Vbat of the electrical power storage device 18. In other words, the inverter DC terminal voltage Vinv can be detected (measured) by the second voltage sensor 54.

The operation amount sensor 34 detects an operation amount of the accelerator pedal 32 as an accelerator pedal opening degree θ. The rotational speed sensor 36 detects a rotational speed N of the motor 24. The power supply switch 38 outputs a signal for switching the power supply of the vehicle 10 from ON to OFF or a signal for switching the power supply of the vehicle 10 from OFF to ON, in response to an operation by a vehicle occupant of the vehicle 10. Signals indicating detection values of the respective sensors and a signal of the power supply switch 38 are supplied to the ECU22 through signal lines (some of which are not shown). The signal lines may be wired, or such signals may be supplied wirelessly.

Figure 3:
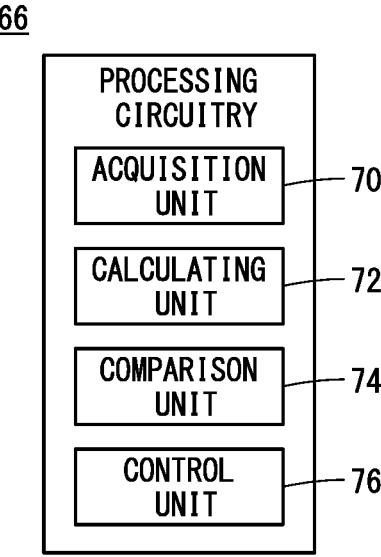
FIG. 3 is a functional block diagram of a processing circuit.

The ECU22 includes processing circuitry 66 and a storage unit 68. The processing circuitry 66 may be a processor such as a CPU. The processing circuitry 66 may be an integrated circuit such as an ASIC or an FPGA. The processor can execute various processes by executing a program stored in the storage unit 68. As illustrated in FIG. 3, the processing circuitry 66 functions as an acquisition unit 70, a calculating unit 72, a comparison unit 74, and a control unit 76. At least some of the plurality of processes performed by the processing circuitry 66 may be performed by an electronic circuit including a discrete device.

The acquisition unit 70 acquires various signals (information) from outside of the ECU 22. The calculating unit 72 performs various calculations. The comparison unit 74 compares outputs (powers) with each other. The control unit 76 controls the fuel cell system 12. For example, the control unit 76 controls the switching elements T1 of the boost converter 16 and the switching elements (not shown) of the inverters 26. The control unit 76 also controls various pumps, injectors, and the like provided in the fuel cell 14.

The storage unit 68 includes a volatile memory and a nonvolatile memory. Examples of the volatile memory include, for example, a RAM or the like. The volatile memory is used as a working memory of the processor. The volatile memory temporarily stores data and the like necessary for processing or operation. Examples of the nonvolatile memory include, for example, a ROM, a flash memory, or the like. The nonvolatile memory is used as a storage memory. The nonvolatile memory stores programs, tables, maps, and the like. At least part of the storage unit 68 may be provided in the processor, the integrated circuit, etc. as described above. The storage unit 68 stores a characteristic 78 shown in FIG. 5.

[2 Maximum Output Pmax]

The maximum power (output) that can be supplied to the motor 24 with respect to the inverter DC terminal voltage Vinv is referred to as a maximum output Pmax. In the fuel cell system 12 according to this embodiment, the electrical power storage device 18 and the load 20 are directly connected to each other. Therefore, the maximum output Pmax is the maximum electric power (output) that can be supplied to the motor 24 with respect to the power storage voltage Vbat of the electrical power storage device 18.

Figure 4:
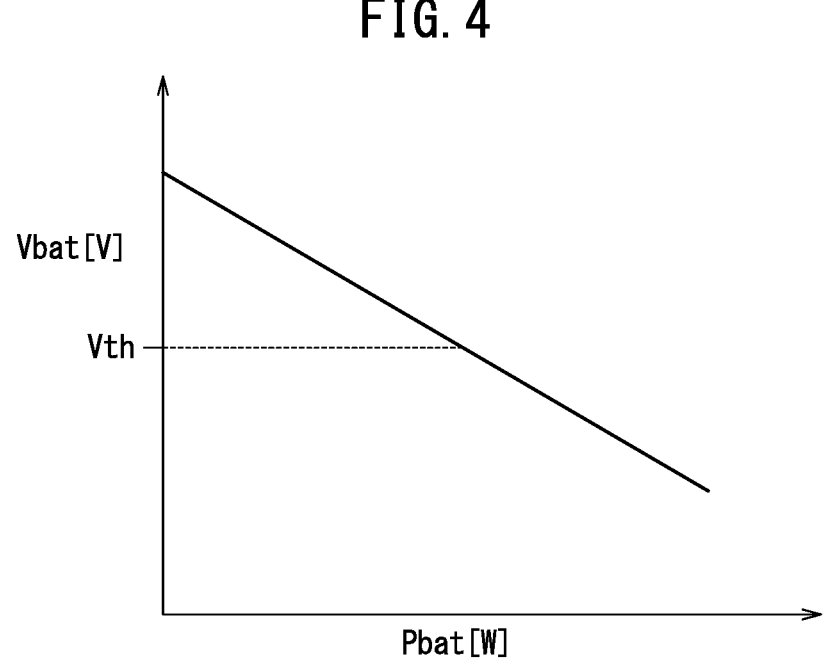
FIG. 4 is a characteristic diagram of a power storage voltage of an electrical power storage device and a power storage output of the electrical power storage device.
Figure 5:
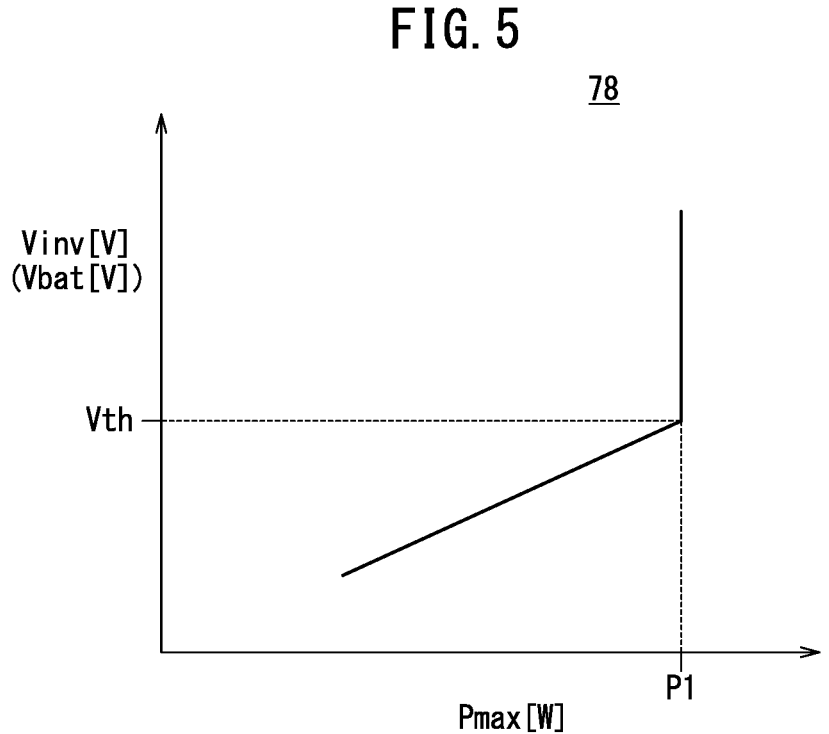
FIG. 5 is a characteristic diagram of an inverter DC terminal voltage and a maximum output.

FIG. 4 is a characteristic diagram of a power storage voltage Vbat of the electrical power storage device 18 and a power storage output Pbat of the electrical power storage device 18. FIG. 5 is a characteristic diagram of the inverter DC terminal voltage Vinv (power storage voltage Vbat) and the maximum output Pmax. The characteristic 78 shown in FIG. 5 is stored in advance in the storage unit 68.

If the power storage current Ibat is constant, as shown in FIG. 4, the power storage voltage Vbat decreases as the power storage output Pbat increases.

As shown in FIG. 5, the maximum output Pmax is an upper limit value (first output P1) determined by specifications of the motor 24 in a voltage range in which the inverter DC terminal voltage Vinv is equal to or higher than a voltage threshold value Vth. On the other hand, in a voltage range in which the inverter DC terminal voltage Vinv is less than a voltage threshold value Vth, the maximum output Pmax decreases as the inverter DC terminal voltage Vinv decreases. As described above, the inverter DC terminal voltage Vinv is equal to the power storage voltage Vbat. In other words, when the power storage voltage Vbat falls below the voltage threshold value Vth, the maximum output Pmax decreases. When the accelerator pedal 32 is depressed in a state where the maximum output Pmax is small, the output of the motor 24 is limited. Therefore, the operation of the vehicle 10 is affected.

In the present embodiment, when the maximum output Pmax is less than the upper limit value (first output P1) and the accelerator pedal 32 is depressed, the control unit 76 performs control such that the power generation output Pfc of the fuel cell 14 is supplied to the motor 24 and the electrical power storage device 18. As a result, the electrical power storage device 18 is charged, and the power storage voltage Vbat increases. As a result, the maximum output Pmax increases.

[3 Operation of Vehicle 10]

A basic operation (power running control and regenerative control) of the vehicle 10 will be described. During traveling of the vehicle 10, the acquisition unit 70 acquires the operation amount (accelerator pedal opening degree θ) of the accelerator pedal 32 from the operation amount sensor 34. The calculating unit 72 calculates a load output Pload based on the operation amount of the accelerator pedal 32. The load output Pload is electric power required to drive the load 20. That is, the load output Pload is the output of the power supply device (the fuel cell 14 and the electrical power storage device 18) required by the operation of the accelerator pedal 32.

If the operation amount of the accelerator pedal 32 is a value greater than zero (0), the control unit 76 performs power running control. The control unit 76 controls the switching element T1 of the boost converter 16 and a switching element (not shown) of the inverter 26 based on a request for the load output Pload. The motor 24 is driven by the power generation output Pfc (boosted power generation output Pfc) supplied from the fuel cell 14 and/or the power storage output Pbat supplied from the electrical power storage device 18. The motor 24 generates a driving force that is power for traveling. The wheels 30 are rotationally driven by the driving force through the transmission 28, and the vehicle 10 travels.

If the operation amount of the accelerator pedal 32 is a value of zero, that is, if the accelerator pedal 32 is released, the control unit 76 performs the regenerative control. The inverter 26 converts inverter AC terminal power due to an AC regenerative output (regenerative power) generated by the motor 24, into inverter DC terminal power. The electrical power storage device 18 is charged with the inverter DC terminal power.

[4 Process Performed by Fuel Cell System 12]

Figure 6:
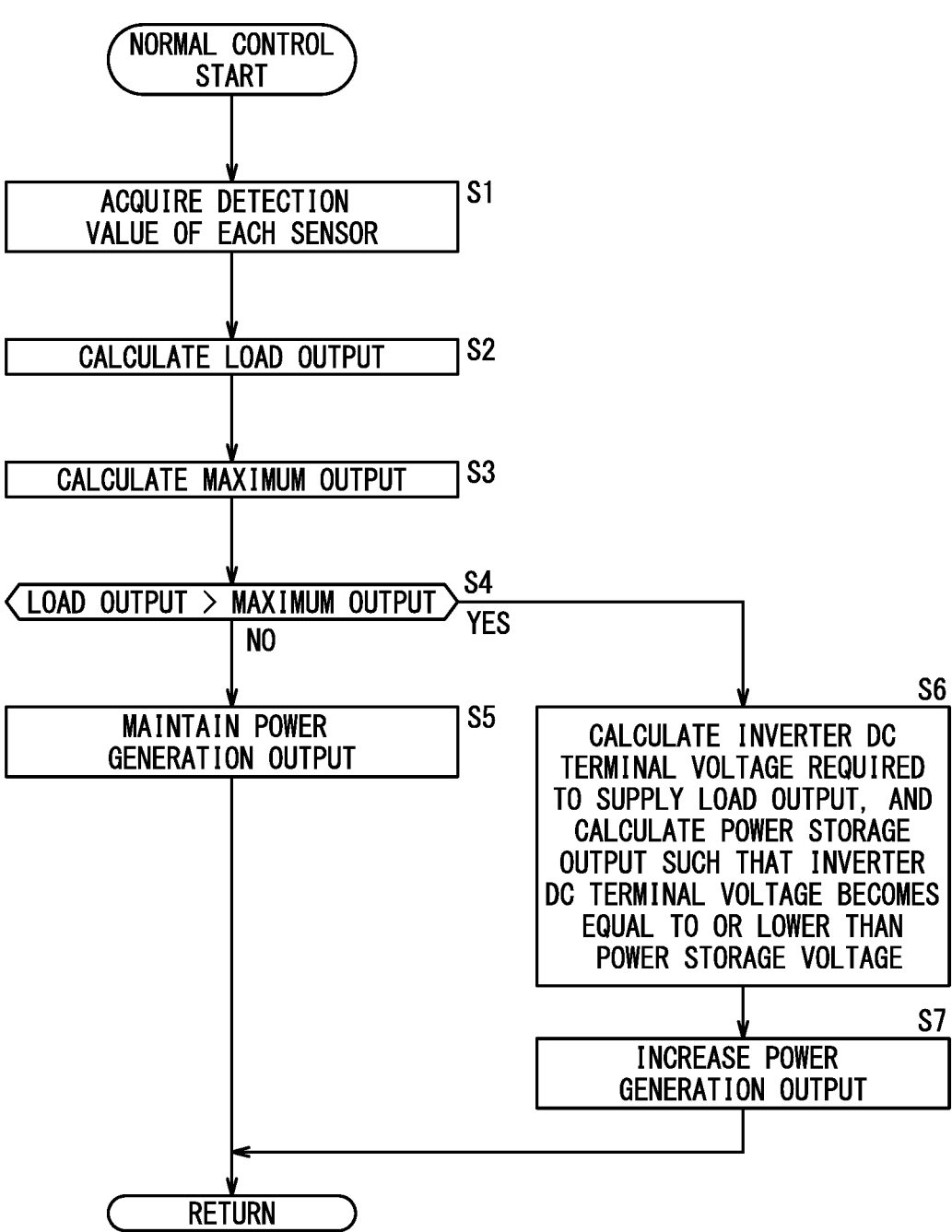
FIG. 6 is a flowchart illustrating a process performed by the processing circuit.

A process performed by the processing circuitry 66 will be described with reference to FIG. 6. FIG. 6 is a flowchart illustrating a process performed by the processing circuitry 66.

In step S1, the acquisition unit 70 acquires a detection value of each sensor. Upon the process transitioning from step S1 to step S2, the calculating unit 72 calculates the load output Pload based on the operation amount of the accelerator pedal 32. Upon the process transitioning from step S2 to step S3, the calculating unit 72 calculates the maximum output Pmax. For example, the calculating unit 72 calculates the maximum output Pmax corresponding to the power storage voltage Vbat based on the detection value of the second voltage sensor 54 and the characteristic 78 shown in FIG. 5.

Upon the process transitioning from step S3 to step S4, the comparison unit 74 compares the load output Pload with the maximum output Pmax. If the load output Pload≤the maximum output Pmax (step S4: NO), the process proceeds to step S5. On the other hand, if the load output Pload>the maximum output Pmax (step S4: YES), the process proceeds to step S6.

Upon the process transitioning from step S4 to step S5, the control unit 76 maintains the power generation output Pfc by controlling the boost converter 16. The power storage output Pbat is supplied to the load 20 (motor 24). When step S5 is completed, one cycle of the process comes to an end. The process returns to step S1.

Upon the process transitioning from step S4 to step S6, the calculating unit 72 calculates the inverter DC terminal voltage Vinv required to supply the load output Pload. Further, the calculating unit 72 calculates the power storage output Pbat such that the inverter DC terminal voltage Vinv becomes equal to or lower than the power storage voltage Vbat.

Upon the process transitioning from step S6 to step S7, the control unit 76 controls the boost converter 16 based on the calculation result in step S6. Specifically, the control unit 76 controls the boost converter 16 such that the load output Pload minus the power storage output Pbat equals the power generation output Pfc (Pload−Pbat=Pfc). By this control, the power generation output Pfc after boosting increases more than before the control. If the power generation output Pfc after boosting increases, the power storage output Pbat decreases. Therefore, the power storage voltage Vbat increases. When step S7 is completed, one cycle of the process comes to an end. The process returns to step S1.

[5 Temporal Changes in Outputs and Voltages]

Figures 7A, 7B, 7C:
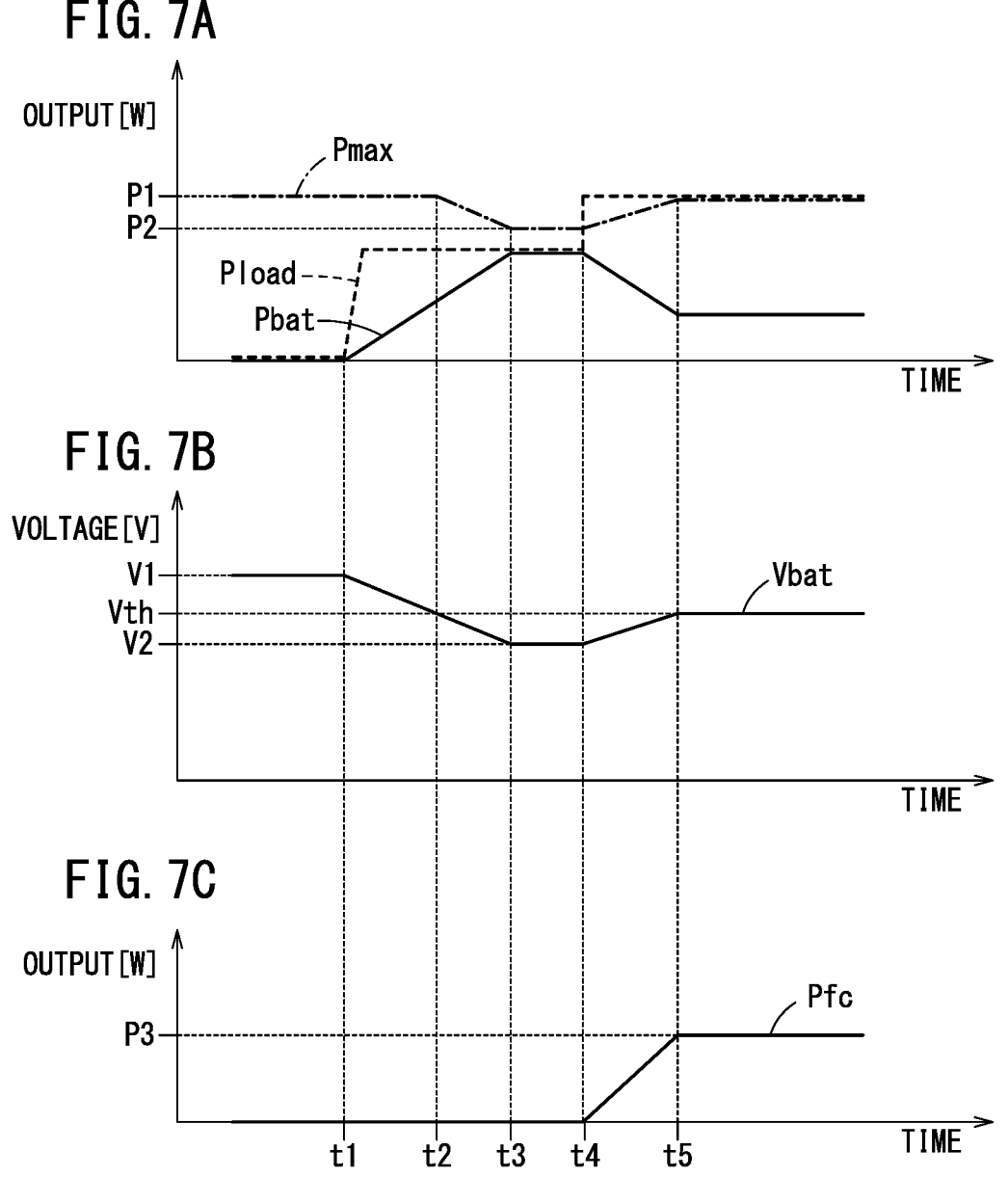
FIG. 7A is a time chart illustrating a maximum output, a load output, and a power storage output that change with time.
FIG. 7B is a time chart illustrating a power storage voltage that changes with time.
FIG. 7C is a time chart illustrating a power generation output that changes with time.

Temporal changes in each output and each voltage will be described with reference to FIGS. 7A to 7C. FIG. 7A is a time chart illustrating the maximum output Pmax, the load output Pload, and the power storage output Pbat that change with time. FIG. 7B is a time chart illustrating the power storage voltage Vbat that changes with time. FIG. 7C is a time chart illustrating the power generation output Pfc that changes with time.

Immediately before time point t1, the accelerator pedal 32 is not operated. As shown in FIG. 7B, the power storage voltage Vbat immediately before time point t1 is a first voltage V1. As shown in FIG. 7A, the maximum output Pmax immediately before time point t1 is the first output P1.

At time point t1, the driver of the vehicle 10 depresses the accelerator pedal 32. Then, as shown in FIG. 7A, the load output Pload increases. The control unit 76 supplies the power storage output Pbat to the motor 24 by controlling the inverter 26. As a result, the power storage output Pbat starts to increase. On the other hand, as shown in FIG. 7B, the power storage voltage Vbat starts to decrease. Here, the electric power supplied to the motor 24 is only the power storage output Pbat.

At time point t2, the power storage voltage Vbat falls below the voltage threshold value Vth. As a result, the maximum output Pmax starts to decrease from the first output P1 (see FIG. 5).

At time point t3, the power storage output Pbat reaches the load output Pload. The increase in the power storage output Pbat is stopped by the control of the control unit 76. Then, the power storage voltage Vbat is maintained at a second voltage V2 that is lower than the first voltage V1. The maximum output Pmax is maintained at the second output P2 which is smaller than the first output P1 and larger than the load output Pload.

At time point t4, the driver of the vehicle 10 depresses the accelerator pedal 32 further. Then, the load output Pload further increases and exceeds the maximum output Pmax maintained at the second output P2. As shown in FIG. 7C, the control unit 76 increases the power generation output Pfc output from the boost converter 16 by controlling the boost converter 16. The power generation output Pfc is supplied to the motor 24. Therefore, in the motor 24, the amount of use (consumption) of the power storage output Pbat of the electrical power storage device 18 decreases. The power generation output Pfc is also supplied to the electrical power storage device 18. As a result, the electrical power storage device 18 is charged, and the power storage voltage Vbat increases. As a result, the maximum output Pmax starts to increase from the second output P2 (see FIG. 5).

At time point t5, the maximum output Pmax reaches the load output Pload. The control unit 76 controls the boost converter 16 to stop increasing the power generation output Pfc. Further, the control unit 76 controls the boost converter 16 and the invertor 26 to maintain the power generation output Pfc at a third electric power P3.

[6 Technical Concepts Obtained from Embodiments]

A description will be given below concerning technical concepts that can be grasped from the above-described embodiments.

A first aspect of the present invention is the control method for the fuel cell system (12), the fuel cell system including the fuel cell (14) configured to generate power generation voltage (Pfc), the electrical power storage device (18) configured to generate power storage voltage (Pbat), the load (20) including the motor (24) and the inverter (26) including the AC terminals (46) connected to the motor and the DC terminals (44) connected to the electrical power storage device, the boost converter (16) including the input terminals (40) connected to the fuel cell and the output terminals (42) connected to each of the electrical power storage device and the DC terminals of the inverter; the memory (68), and the processing circuitry (66) configured to execute a program recorded in the memory. By the processing circuitry executing the program recorded in the memory, the method includes calculating the load output (Pload) that is electric power required to drive the load, and calculating the maximum output (Pmax) that is maximum electric power that is configured to be supplied from the electrical power storage device to the load (step S3), comparing the load output with the maximum output (step S4), and controlling, in a case that the load output exceeds the maximum output, the fuel cell system to decrease the power storage output (Pbat) used by the load, by increasing the power generation output (Pfc), which is electric power supplied from the fuel cell to the load via the boost converter (step S7).

In the above-described configuration, when the load output exceeds the maximum output, the processing circuitry controls the system to supply the power generation output of the fuel cell to the motor. Since the power generation output of the fuel cell is supplied to the motor, the amount of use (consumption) of the power storage output of the electrical power storage device is reduced. Then, the electrical power storage device is charged, and the power storage voltage increases. As a result, the maximum output is increased. Therefore, according to the above configuration, even if the fuel cell system does not include a converter for the electrical power storage device, the performance of the motor can be sufficiently exhibited.

According to the first aspect, in the controlling, the power generation output may be increased until the maximum output becomes equal to or greater than the load output, the maximum output being increased when the power storage output is decreased.

A second aspect is the fuel cell system including the fuel cell configured to generate power generation voltage, the electrical power storage device configured to generate power storage voltage, the load including the motor and the inverter including the AC terminals connected to the motor and the DC terminals connected to the electrical power storage device, the boost converter including the input terminals connected to the fuel cell and the output terminals connected to each of the electrical power storage device and the DC terminals of the inverter; the memory, and the processing circuitry configured to execute a program recorded in the memory. By the processing circuitry executing the program recorded in the memory, the system calculates the load output that is electric power required to drive the load, and calculating the maximum output that is maximum electric power that is configured to be supplied from the electrical power storage device to the load, compares the load output with the maximum output, and controls, in a case that the load output exceeds the maximum output, the fuel cell system to decrease the power storage output used by the load, by increasing the power generation output, which is electric power supplied from the fuel cell to the load via the boost converter.

A third aspect is the fuel cell vehicle (10) in which the fuel cell system according to the second aspect is mounted, wherein the motor is used as a traveling motor.

The present invention is not limited to the above disclosure, and various modifications are possible without departing from the essence and gist of the present invention.

What is claimed is:

1. A control method for a fuel cell system, the fuel cell system comprising:

a fuel cell configured to generate power generation voltage;

an electrical power storage device configured to generate power storage voltage;

a load including a motor and an inverter including AC terminals connected to the motor and DC terminals connected to the electrical power storage device;

a boost converter including input terminals connected to the fuel cell and output terminals connected to each of the electrical power storage device and the DC terminals of the inverter;

a memory; and processing circuitry configured to execute a program recorded in the memory, by the processing circuitry executing the program recorded in the memory, the method comprising:

calculating a load output that is electric power required to drive the load, and calculating a maximum output that is maximum electric power that is configured to be supplied from the electrical power storage device to the load;

comparing the load output with the maximum output; and controlling, in a case that the load output exceeds the maximum output, the fuel cell system to increase a power generation output, which is electric power supplied from the fuel cell to the load via the boost converter, and to decrease a power storage output used by the load, wherein in the controlling, upon detecting that the maximum output has reached the load output, the power generation output that has been increased is held to an increased level.

2. A fuel cell system comprising:

a fuel cell configured to generate power generation voltage;

an electrical power storage device configured to generate power storage voltage;

a load including a motor and an inverter including AC terminals connected to the motor and DC terminals connected to the electrical power storage device;

a boost converter including input terminals connected to the fuel cell and output terminals connected to each of the electrical power storage device and the DC terminals of the inverter;

a memory; and processing circuitry configured to execute a program recorded in the memory, by the processing circuitry executing the program recorded in the memory, the system:

calculates a load output that is electric power required to drive the load, and calculating a maximum output that is maximum electric power that is configured to be supplied from the electrical power storage device to the load;

compares the load output with the maximum output; and controls, in a case that the load output exceeds the maximum output, the fuel cell system to increase a power generation output, which is electric power supplied from the fuel cell to the load via the boost converter, and to decrease a power storage output used by the load; and holds the power generation output to an increased level when the maximum output reaches the load output.

3. A fuel cell vehicle in which a fuel cell system is mounted, wherein the fuel cell system comprises:

a fuel cell configured to generate power generation voltage;

an electrical power storage device configured to generate power storage voltage;

a load including a motor and an inverter including AC terminals connected to the motor and DC terminals connected to the electrical power storage device;

a boost converter including input terminals connected to the fuel cell and output terminals connected to each of the electrical power storage device and the DC terminals of the inverter;

a memory; and processing circuitry configured to execute a program recorded in the memory, by the processing circuitry executing the program recorded in the memory, the system:

calculates a load output that is electric power required to drive the load, and calculating a maximum output that is maximum electric power that is configured to be supplied from the electrical power storage device to the load;

compares the load output with the maximum output; and controls, in a case that the load output exceeds the maximum output, the fuel cell system to increase a power generation output, which is electric power supplied from the fuel cell to the load via the boost converter, and to decrease a power storage output used by the load; and holds the power generation output to an increased level when the maximum output reaches the load output, and wherein the motor is used as a traveling motor.

* * * * *